(12) United States Patent
Stoelinga

(10) Patent No.: US 7,658,355 B2
(45) Date of Patent: Feb. 9, 2010

(54) SUPPORT ARM

(75) Inventor: Dirk Jan Stoelinga, Soest (NL)

(73) Assignee: S & B Systems B.V., Soest (NL)

( * ) Notice: Subject to any disclaimer, the term of this patent is extended or adjusted under 35 U.S.C. 154(b) by 0 days.

(21) Appl. No.: 11/707,859

(22) Filed: Feb. 20, 2007

(65) Prior Publication Data

US 2008/0197257 A1     Aug. 21, 2008

(51) Int. Cl.
*E04G 3/00*    (2006.01)
(52) U.S. Cl. .................................. 248/278.1
(58) Field of Classification Search ............. 248/278.1, 248/276.1; 361/682; 49/333, 334, 335
See application file for complete search history.

(56) References Cited

U.S. PATENT DOCUMENTS

| | | | |
|---|---|---|---|
| 4,170,336 A | 10/1979 | Malis | ......................... 248/276 |
| 5,332,181 A | 7/1994 | Schweizer et al. | ....... 248/123.1 |
| 7,207,537 B2 * | 4/2007 | Hung | ..................... 248/284.1 |
| 2004/0178312 A1 * | 9/2004 | Parsons | .................... 248/276.1 |
| 2005/0284997 A1 * | 12/2005 | Tisbo et al. | .............. 248/276.1 |
| 2007/0040084 A1 * | 2/2007 | Sturman et al. | ........ 248/280.11 |

FOREIGN PATENT DOCUMENTS

EP    1471300 A2    3/2004

* cited by examiner

*Primary Examiner*—Ramon O Ramirez
(74) *Attorney, Agent, or Firm*—Morgan Lewis & Bockius LLP

(57) ABSTRACT

The invention provides a support arm for an apparatus, preferably for a display screen, comprising a first fastening part for attachment to a frame or a wall, a first member, at one end coupled to the first fastening part and at another end coupled to a first pivot joint which allows rotation about a first axis of rotation, a second member which, at a first end, is coupled to the first pivot joint, and, at a second end, is provided with a second pivot joint which allows rotation about a second axis of rotation, a second fastening part for attaching the apparatus to the support arm, coupled to the second pivot joint, the first and second axes of rotation essentially being parallel to one another. The second fastening part is connected to a substantially L-shaped third member via a third pivot coupled to the second pivot joint.

18 Claims, 7 Drawing Sheets

SUPPORT ARM

CROSS-REFERENCE TO RELATED APPLICATIONS

This application claims the benefit of Netherlands Application No. 2000262 filed on Oct. 6, 2006, the content of which is herein incorporated by reference in its entirety.

BACKGROUND OF THE INVENTION

The invention relates to a support arm for an apparatus, preferably a display screen, specifically a flat display screen. The invention furthermore relates to a pivot joint, in particular suitable for a support arm.

Such support arms are known per se. However, it is difficult to automate the known support arms and they are not stable.

SUMMARY OF THE INVENTION

It is an object of the invention to provide a support arm which can be manufactured in a simple and inexpensive manner from components which can readily be obtained and modified.

It is another object of the invention to provide a support arm which can easily be automated.

It is another object of the invention to provide a support arm which is and remains stable, even with intense use.

To this end, the invention provides a support arm for an apparatus, preferably for a display screen, comprising:
- a first fastening part for attaching the support arm to a frame or a wall,
- a first member, at one end coupled to the first fastening part and at another end coupled to a first pivot joint which allows rotation about a first axis of rotation;
- a second member which, at a first end, is coupled to the first pivot joint and, at a second end, is provided with a second pivot joint which allows rotation about a second axis of rotation;
- a second fastening part for attaching the apparatus to the support arm, which second fastening part is coupled to the second pivot joint, the first and second axes of rotation essentially being parallel to one another.

As a result of the positioning of the members with respect to one another and the use of the pivot joints, a support arm can be produced in a simple and inexpensive manner, which support arm is simple to operate and remains stable during operation, even with large and heavy display screens.

In this context, the term pivot joint is understood to mean a joint which connects two members to one another and allows for the two members to rotate with respect to one another, that is to say for two straight members which are in line with one another to pivot relative to one another about the longitudinal axis through the two members. This is in contrast with a hinge joint which allows for two members to hinge relative to one another.

In one embodiment of the support arm, the second member is substantially U-shaped. As a result, it is readily possible for the axes of rotation of the pivot joints to be parallel. However, the two legs of the U in this case do not have to be of equal length.

In one embodiment of the support arm, the first member is substantially L-shaped.

In one embodiment of the support arm, the second fastening part is connected to a third member and the third member is coupled to the second pivot joint.

In one embodiment of the support arm, the third member is substantially L-shaped.

In one embodiment of the support arm, the third member is connected to the second pivot joint via a third pivot joint. By means of this construction, the display screen can be positioned in virtually any viewing position and the display screen can be easily displaced by means of the support arm.

In one embodiment of the support arm, the members comprise tube parts, the pivot joints comprising inner tube parts mounted in the tube parts, the inner tube parts in particular being mounted by means of an outer ring for forming a stop for an end of a tube part of a member, the stop running obliquely with the acute angle being situated against the inner tube surface and the end surface of the tube parts running obliquely with the acute angle being situated at the outer surface, the outer ring preferably being a plastic ring, for example made of nylon. In one embodiment, the tube parts are simply iron tube parts. This makes it possible to produce a support arm which is stable and inexpensive and virtually without play.

In one embodiment of the support arm, inner tube parts are furthermore mounted by bearing parts at the ends of the inner tube parts which extend into the tube parts, the bearing parts outside the outer wall of the inner tube parts extending as far as against the inner wall of the outer tube parts, and preferably being made of plastic, such as nylon.

In one embodiment of the support arm, the pivot joints furthermore comprise clamping parts for rotatably clamping the stop of the outer ring onto the end of the tube parts.

In one embodiment of the support arm, the first joint is coupled with an actuator which, during operation, swivels the second member about the first axis of rotation, the second joint is coupled to a second actuator which, during operation, causes the second fastening to rotate or swivel about the second axis of rotation, and displaces the second fastening part relative to the first fastening part upon actuation of the first and second actuator. As a result of the abovementioned construction, it is simple to fit actuators, preferably provided with electric motors, as a result of which the support arm can be operated and adjusted, for example by means of a remote control. To this end, a control unit is furthermore provided.

The invention furthermore relates to a support arm, in particular for a flat display device, such as an LCD screen or plasma screen, comprising a first and second member having a first and second longitudinal axis and a first joint which connects the members to one another at an angle, the first member being coupled to a fastening part for attaching the aim, the first joint comprising a first angle part having a first and second end, the first end being coupled to the first member so as to be rotatable about the longitudinal axis of the first member, and the second end being coupled to the second member so as to be rotatable about the longitudinal axis of the second member, and the first and second end being coupled to a first and second drive unit, respectively, which are connected to a first and second member respectively, in order to cause the first angle part, upon actuation of the first drive unit, to rotate about the longitudinal axis of the first member and in order to cause the second member, upon actuation of the second drive unit, to rotate about its longitudinal axis.

In one embodiment this support arm comprises a third member having a longitudinal axis and a second joint which connects the second member and the third member to one another, and the second joint in this case comprises a second angle part having a first and second end, the first end being coupled to the second member so as to be rotatable about the longitudinal axis of the second member, and the second end being coupled to the third member so as to be rotatable about the longitudinal axis of the third member, and the first and second end are coupled to a third and fourth drive unit, respectively, which are connected to the first and second member, respectively, in order to cause the second angle part, upon actuation of the third drive unit, to rotate about the longitudinal axis of the second member and in order to cause the third member, upon actuation of the fourth drive unit, to rotate about its longitudinal axis. Connecting pivot joints to one another by means of an angle part makes it possible to provide a simple and stable adjustment. By, for example, producing an angle part (preferably of 90 degrees) of tubes and by mounting the two ends of the angle part in tube ends or by accommodating them by means of bearings in tube parts, two pivot joints at right angles are produced in a simple manner.

In one embodiment of this support arm, the third member comprises a frame fastening part for attaching a frame, in particular for attaching a flat display device such as an LCD screen or a plasma screen. The support arm according to the invention can, for example, be folded flat in a simple manner between the wall and the flat display screen.

In one embodiment of this support arm, in a starting position, the fastening part and the first, second and, if present, third member and frame fastening part are essentially situated in a starting plane.

In one embodiment of this support arm this furthermore comprises a hinge connected to the first member and the fastening part for hingedly coupling the first member to the fastening part, as a result of which an angle adjustment of the longitudinal axis of the first member in the starting plane is possible.

In one embodiment of this support arm, this furthermore comprises an actuator between the fastening part and the first member, in particular, between the fastening part and, if present, the hinge, the actuator comprising a first actuator part which is connected to the fastening part and a second actuator part which is connected to the first member and/or the hinge, and the first and second actuator part being displaceable relative to one another along an axis of displacement.

In one embodiment of this support arm the axis of displacement is substantially parallel to the starting plane, and preferably extends substantially in the starting plane.

In one embodiment of this support arm, the drive units are furthermore coupled to the pivot joints by means of transmissions, the transmission being provided with a drive shaft in line with the longitudinal axis and with a first ring with internal toothing thereon which is connected to the one tube part, an eccentric gear wheel with a toothing which is at least one tooth smaller than the internal toothing of the first ring and the toothing of which engages with the internal toothing of the first ring and which is provided with driver parts, and a second ring which is connected to the other tube part and which is provided with the driver parts which mate with the driver parts of the gear wheel, as a result of which the first and second ring rotate with respect to one another when the drive unit is in operation. The drive units are, for instance, electric motors.

It will be clear that the features of this support arm and the support arm mentioned before can be combined with one another.

The invention furthermore relates to a pivot joint for a support arm, comprising a first tube part having a longitudinal axis, a second tube part, one end of which is rotatably mounted and extends into the first tube part, and provided with an electric motor attached in the first or second tube part, the first tube part and the second tube part being coupled to one another by means of a transmission, the transmission being provided with a drive shaft, driven by means of the electric motor and in line with the longitudinal axis and with a first ring with internal toothing thereon and which is connected to the one tube part, an eccentric gear wheel with a toothing which is at least one tooth smaller than the internal toothing of the first ring and the toothing of which engages with the internal toothing of the first ring and which is provided with driver parts, and a second ring which is connected to the other tube part and which is provided with driver parts mating with the driver parts of the gear wheel, as a result of which the first and second ring rotate with respect to one another when the electric motor is in operation. The pivot joint can easily be produced by means of tubes, is able to transmit and/or generate great forces, is virtually without any play and, in rest, maintains its position.

In one embodiment of this pivot joint, the first ring and the second ring are in this case mounted on the drive shaft of the transmission.

In one embodiment of this pivot joint, the gear wheel is provided with pins as driver parts, which pins extend into holes in a second ring, which holes have a larger diameter than the diameter of the pins. As a result, the first and second ring can be functionally and operationally coupled to one another in a simple manner.

It will be clear that the different aspects mentioned in this patent application can be combined and each individual aspect qualifies for a divisional patent application.

BRIEF DESCRIPTION OF THE DRAWINGS

The attached figures show various embodiments of a support arm and a pivot joint according to the invention, in which.

DESCRIPTION OF EMBODIMENTS

Figure 1:
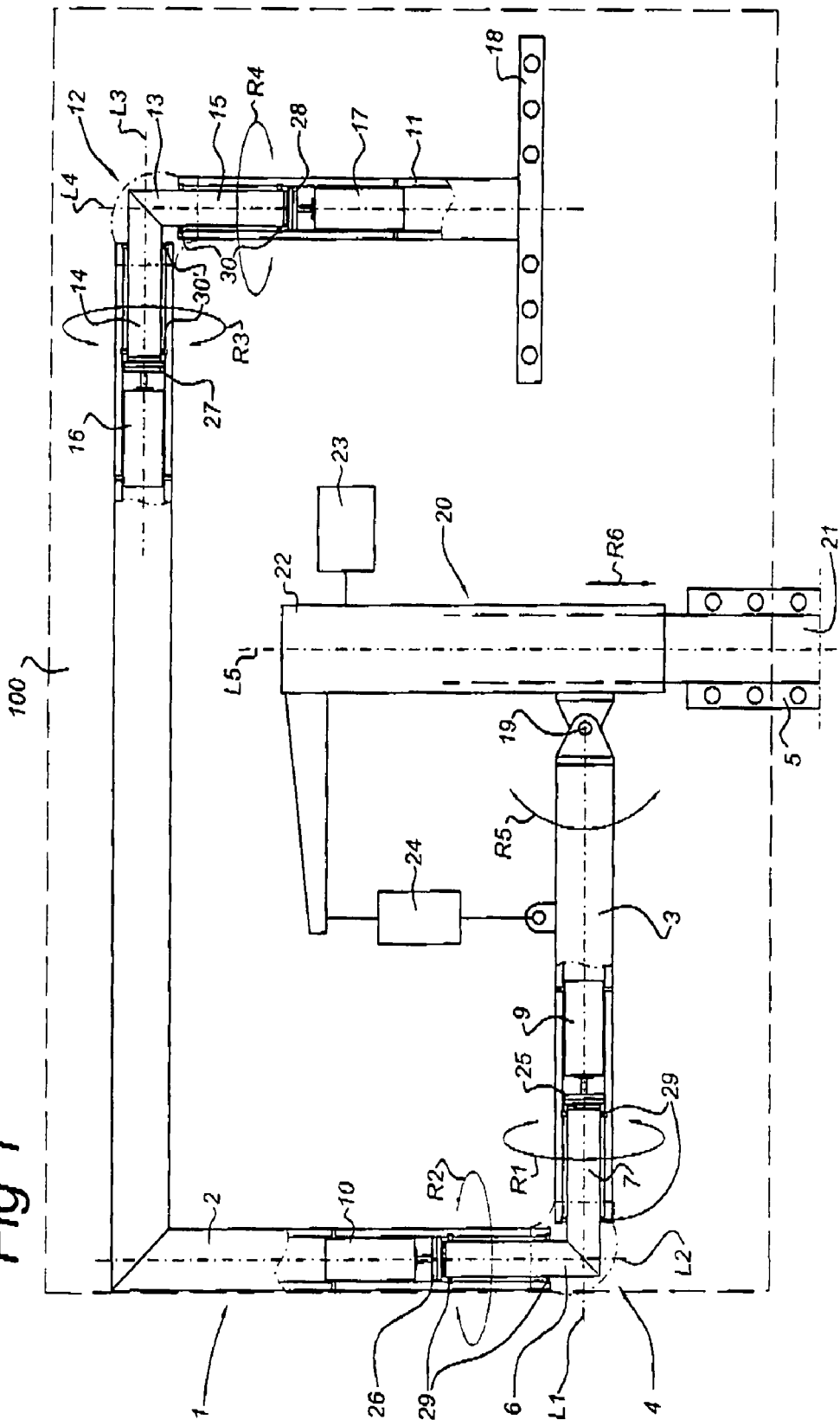
FIG. 1 shows a first embodiment of a support arm according to the invention.

FIG. 1 shows a support arm 1, which is in this case provided with a flat LCD screen 2 which is indicated by means of dashed lines. The support arm 1 is provided with a first member 3 and a second member 2, which have a first longitudinal axis L1 and a second longitudinal axis L2, respectively. The first member 3 and the second member 2 are coupled to one another by means of two rotation joints 4, which connect the two members 3, 2 at an angle. The members 2, 3 are in this case connected at an essentially right angle. The first member 3 is coupled to a fastening part 5, in this case a fastening part for attaching the arm 1 on or against a wall. Alternatively, the support arm may also be attached to a floor or on or in a piece of furniture. A fastening part will be adapted to such a construction. For a person skilled in the art, the design of such a fastening part is simple. The members in this description are preferably round tubes.

The first pair of joints 4, which connects the first member 3 and the second member 2 to one another at an angle, makes it possible to carry out a rotation about the longitudinal axis L1. This rotation is indicated by R1. In addition, the pair of joints 4 makes a rotation about the axis L2 possible. This rotation is indicated by R2.

The first pair of joints 4 has an angle part 6, in this case an elbow, which connects the two joints to one another. The angle part is provided with a first end 7 and a second end 8. The first end 7 is coupled to the first member by means of a transmission 25 and is driven by means of a drive 9, in this case an electric motor, which in this case is also connected to the first member 3. In this embodiment, the first member 3 is designed as a hollow tube. The first end 7 is mounted rotatably by means of bearings 27 in this tube and forms the first pivot joint. The second end 8 of the angle part 6 is coupled to the second member 2 by means of a transmission 26 and the coupling is driven by a drive unit 10, likewise an electric motor, which in this case is also connected to the second member 2. The second member 2 is in this embodiment also designed as a tube, for example a round tube. The second end 8 of the angle element 6 is also mounted rotatably here by means of bearings 28 in the tube and thus forms the second pivot joint. As a result, the tube of the second member 2 can rotate about the longitudinal axis 2, which rotational movement, as mentioned earlier, is indicated by R2. The second member 2 is bent, in this case at an angle of 90°, and has a second part with a longitudinal axis L3. The end of that part of the second member 2 is provided with two pivot joints 12, which couple the end of the second member 2 to a third member 11 at an angle. The second pair of joints 12 is virtually identical to the first pair of joints 4.

The second pair of pivot joints 12 is connected to one another by means of an angle part 13, in this case also designed as an elbow made from tube parts, having a first end 14 and a second end 15. The third member 11 has a longitudinal axis, which is indicated by L4. The first end 14 of angle part 13 is coupled to the second member 2 by means of a coupling 27 and the coupling is driven by a drive unit 16, in this case once more an electric motor. The second end 15 of angle part 13 is coupled to the fourth member 11 by means of a transmission 28 and in this case the coupling is also driven by means of an electric motor 17. Driven by the drive units 16 and 17, the pair of joints is able to make a rotation about longitudinal axis L3 possible, this rotational movement is indicated by R3, and the pair of joints is able to make a rotation about longitudinal axis L4 possible, this rotational movement is indicated by R4.

In this embodiment, the third member 11 is designed as a tube part just like the other members, preferably a round hollow tube part. By means of bearings 29, the first end 14 of angle part 13 is rotatably mounted in the tube part, the bent tube part of the second member 2, which bent tube part has a longitudinal axis L3. As a result, a third pivot joint is formed and the third member can rotate about this longitudinal axis L3, which rotational movement is indicated by R3 in the figures. By means of bearing 30, the angle part 13 is rotatably mounted in the tube part of the third member 11 with its second end 15 and forms the fourth pivot joint, so that the tube part can rotate (R4) about its longitudinal axis L4.

In this embodiment, a fastening part 18 is fitted to the end of the third member 11, by means of which the LCD screen 2 can be attached to the arm. The person skilled in the art may, of course, also come up with and conceive other kinds of fastening.

In this case, the first member 1 is at one end connected by means of a hinge 19 to an actuator 20, which is provided with the abovementioned fastening parts 5. The hinge makes an angle adjustment of the first member 3), in particular of the longitudinal axis L1 thereof, possible. This angle adjustment is indicated in FIG. 1 by R5. The angle adjustment may be carried out by means of a drive unit 24, illustrated in the figure, which will be driven by means of an electric motor in one embodiment.

The actuator 20 makes it possible to adjust the arm 1 along the longitudinal axis L5. In practice, this will be a height adjustment. To this end, the actuator 20 comprises an outer tube 22 with an inner tube 21 inside it. In one embodiment, the inner tube 21 is provided with an outer screw thread, thus in effect forming a spindle, and the outer tube 22 is provided with a spindle guide, which is not shown in more detail in the figure. By means of a drive unit 23, in this case an electric motor, the inner tube or spindle 21 is made to rotate via a right-angled transmission, as a result of which the outer tube will be displaced linearly along the longitudinal axis L5. When the support arm 1 is attached, for example to a wall, by means of the fastening parts 5, it will consequently be possible to move the display screen 2 up and down.

In the support arm, the pivot joints are formed by tubes mounted inside one another. By coupling the tubes to one another by means of a coupling and subsequently driving the coupling, for example by means of an electric motor, an operable support arm can be achieved.

Figure 2:
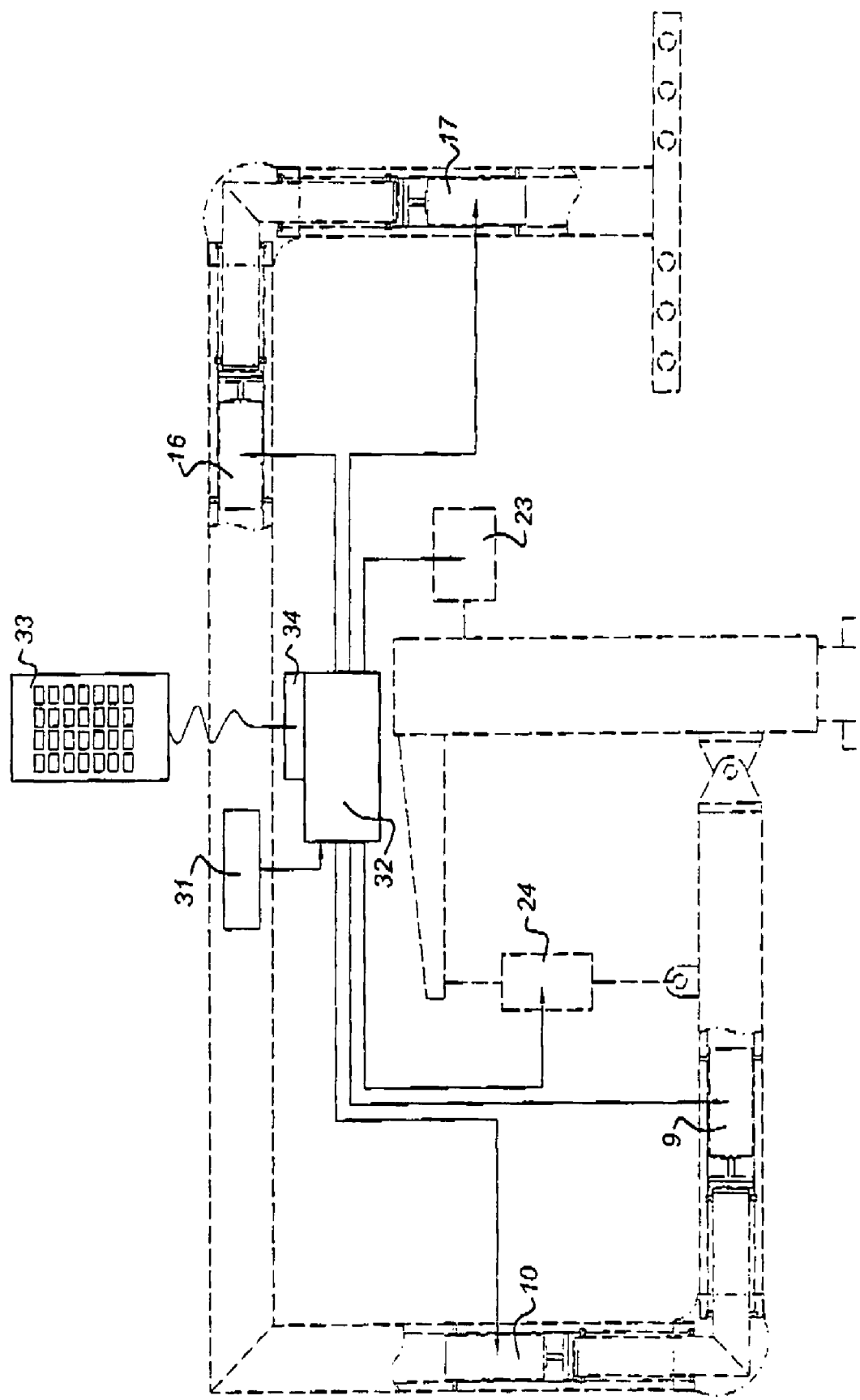
FIG. 2 shows an embodiment of a control device for the support arm from FIG. 1.

FIG. 2 shows the control mechanism of the support arm from FIG. 1, in which, for the sake of clarity, the components which have already been illustrated in FIG. 1 are indicated by dashed lines.

The control device 32 is in this case provided with a wireless receiver 34, to which instructions for the displacement of the support arm can be given by means of a remote control 33. Furthermore, the support arm is provided with an electronic spirit level 31, which emits signals to the control device 32. In use, an individual operating the support arm, for example in order to displace a flat LCD or plasma screen attached to the support arm, will give the instruction, by means of the remote control 33, that the display screen be moved forwards or the display screen be tilted. These instructions via the remote control 33 will be sent to the receiving unit 34 of the control unit 32 wirelessly. The control unit 32 will then calculate which motors have to be actuated and will then proceed to actuate these motors. The digital spirit level 31 will determine whether the display screen is still horizontal during the displacement. If this is not the case, a signal will be emitted to the control unit 32. In practice, the readout of the digital spirit level will be sent to the control unit 32 under all circumstances. Based on the values from the digital spirit level, the control unit 32 will calculate the position of the display screen and, if the latter is no longer horizontal, the control unit 32 will emit a signal to the electric motor 24, as a result of which the position of the support arm can be adjusted, in such a manner that the display screen is horizontal again.

Figure 3:
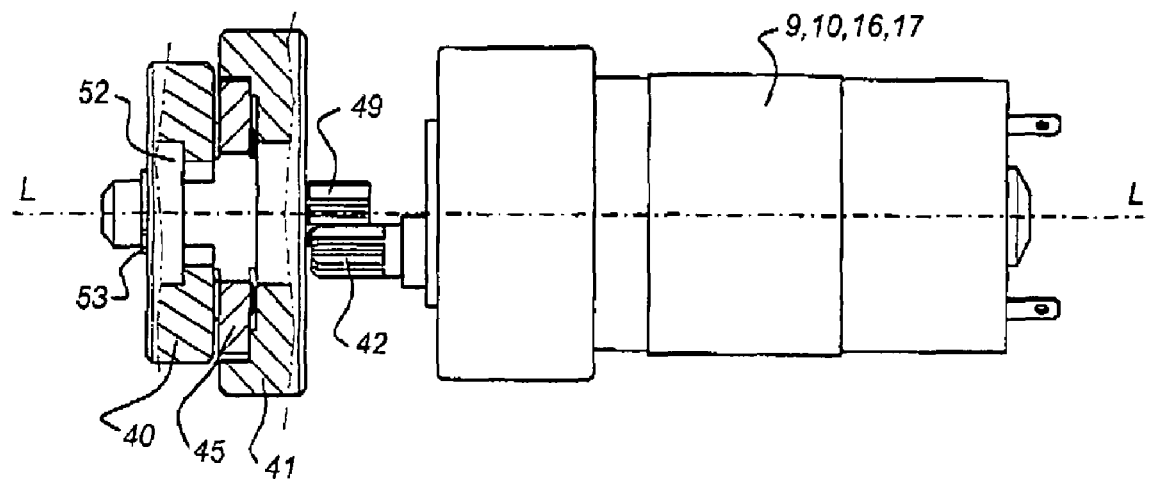
FIG. 3 shows a side view of an electric motor with a transmission for the support arm from FIG. 1.
Figure 4:
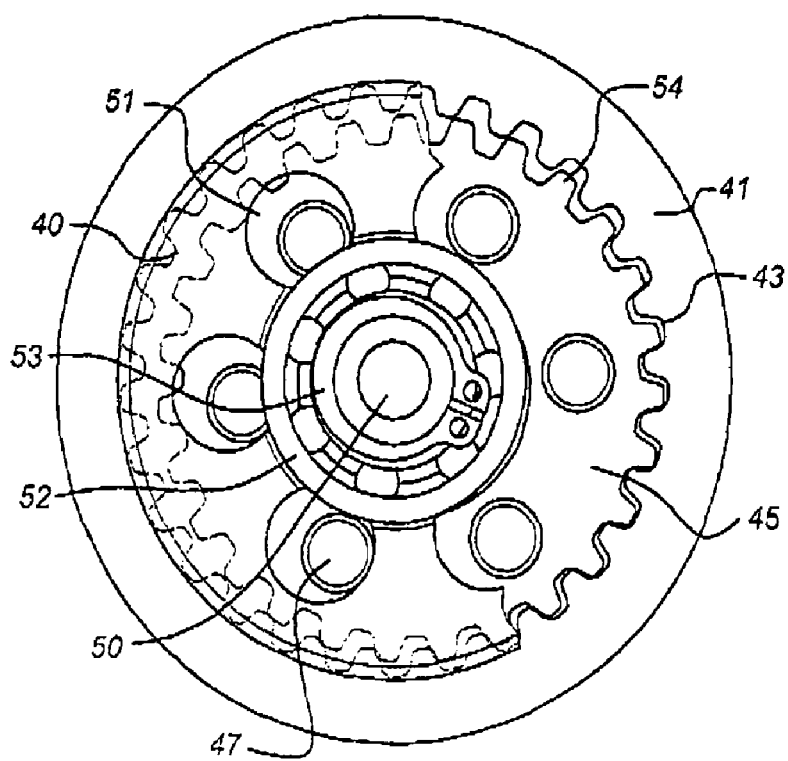
FIG. 4 shows a front view of FIG. 3.
Figure 5:
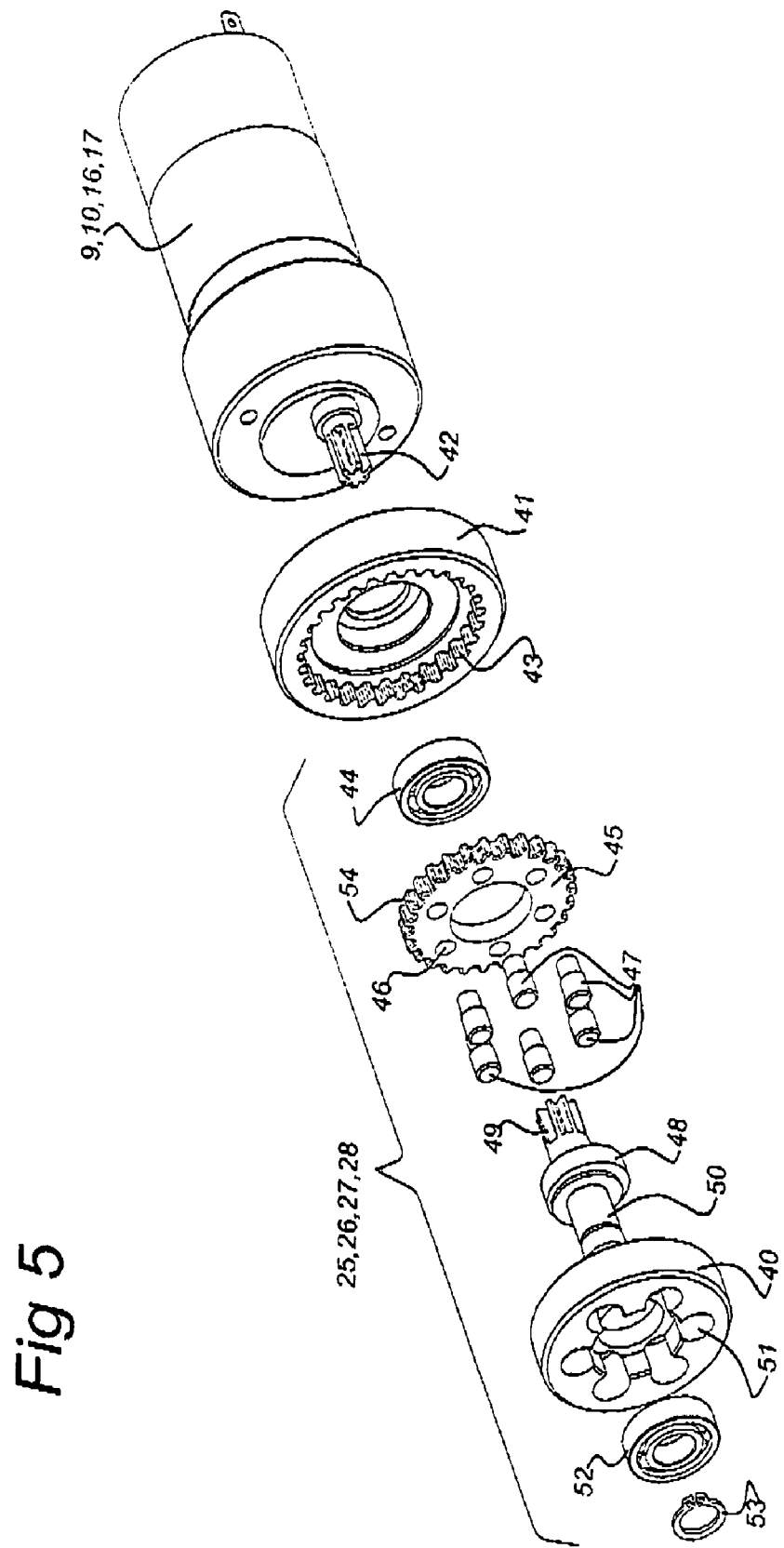
FIG. 5 shows an exploded view of FIG. 3.

FIGS. 3 to 5 show the electric motor, indicated in FIGS. 1 and 2 by the numbers 9, 10, 16 and 17, provided with the coupling, indicated in FIGS. 1 and 2 by numbers 25, 26, 27 and 28, in order to adjust the rotation joint or pivot joint. In FIG. 3, the longitudinal axis indicated by L. This is the representation of the axes of rotation which are indicated in FIG. 1 by L1, L2, L3 and L4.

The coupling 25, 26, 27, 28 is driven by a toothing 42 of the drive shaft of the electric motor 9, 10, 16, 17 by means of a toothing 49.

The coupling is provided with a first ring 41, provided with an internal toothing 43 (see FIG. 4), then a gear wheel 45 provided with a toothing 54 (see FIG. 4 again) and a second ring 40. The first ring 41, gear wheel 45 and second ring 41 are mounted on a common shaft, the first ring 41 being mounted on the shaft by means of bearing 44, gear wheel 45 is mounted on the shaft eccentrically by means of eccentric or cam 48 and the second ring 40 is mounted on the end 50 of the shaft by means of bearing 52.

FIG. 4 shows a front view of the transmission with part of the ring 40 having been removed. In this figure, it can be seen that the toothing 54 of the gear wheel 45 has a toothing which differs only slightly (usually only by a few teeth) from the internal toothing 43 of the ring 41. The gear wheel 45 is provided with holes 46 which hold pins 47, the latter meshing with holes 51 in the ring 40. The pins 47 fit accurately into the holes 46 of gear wheel 45, and the diameter of the holes 51 in ring 40 is greater than the thickness of the pins 47. In the so-called exploded view of FIG. 5, this is all clearly illustrated.

FIG. 5 shows the transmission 25, 26, 27, 28 from FIGS. 1 and 2 in exploded view. In this case, it can be seen that the toothed shaft 42 of the electric motor engages with a toothed drive shaft 49 of the transmission. Furthermore, this drive shaft is provided with an eccentric or eccentric cam 48 and an end shaft part 50. The first ring 41 is in this case mounted on a bearing 44 on the drive shaft. As is clearly illustrated here, the gear wheel 45 is provided with holes 46 into which pins 47 extend. These pins 47 furthermore extend into openings 51 of the ring 40. The ring 40 is mounted on the end 50 of the drive shaft of the transmission by means of the bearing 52, and held on this shaft by means of retaining ring 53. The cam bears against the interior of the hole in gear wheel 45 in such a manner that a part of the toothing of gear wheel 45 engages with the internal toothing 43 of the first ring 41.

The operation of the coupling 25, 26, 27, 28 is as follows. The toothed drive shaft 42 transmits the rotation of the electric motor onto the shaft of the coupling by means of the toothing 49, as a result of which this shaft will start to rotate. The gear wheel 45 is mounted on the eccentric or cam 48 and will therefore perform an eccentric rotation. The cam is designed in such a manner that the gear wheel will in each case run in part of the inner toothing 43 of the ring 41. The rotation of the gear wheel 45 will subsequently be transmitted to the ring 40 by means of the pins 47.

With the use as described in FIG. 1, the first ring 41 is connected inside the outer tube 2, 3, 11 of FIG. 1. The second ring 40 is connected, for example, to an end of the inner tube, which is indicated in FIG. 1 by reference numerals 6, 7, 14, 15.

Figure 6:
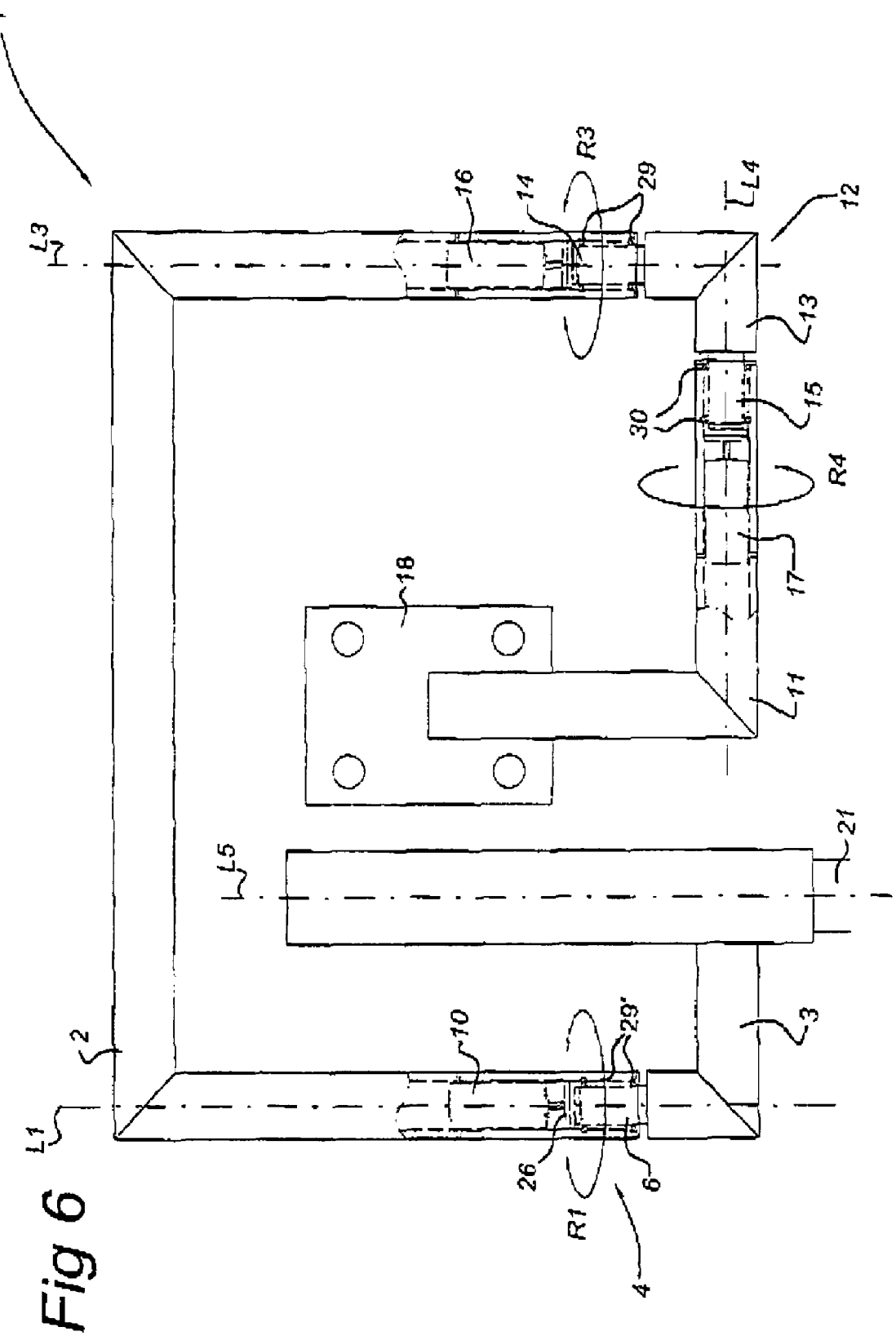
FIG. 6 shows an alternative embodiment of a support arm according to the invention.

FIG. 6 shows an alternative configuration of a support arm according to the invention. In this case, the support arm 1 is provided with an L-shaped first member 3 which is attached here so that it can rotate about axis of rotation L5. Pivot joint 4 enables rotation R1 about axis of rotation L1. The second member 2 is U-shaped and has at its end a second pivot joint which enables rotation R3 about axis of rotation L3. Axes of rotation L1 and L3 are virtually parallel. By means of these axes of rotation, tilting of, for example, a flat display screen attached to the support arm about one of the axes L1 or L3 is possible. In addition, the display screen can be moved away from, for example, a wall to which the support arm is attached by means of an opposite rotation about the two axes of rotation. In this case, the orientation of the display screen will not change, that is to say the angle between L4 and L3 will in this case change little, if at all.

The display screen can tilt about an axis parallel to L4 by means of a rotation of the pivot joint about the axis L4. Thus, a display screen is completely adjustable for the viewer.

Pivot joints 12 are connected to one another by means of an elbow piece 13 which in this case has an angle of 90 degrees. As a result, axes L3 and L4 are at an angle of 90 degrees. In this embodiment, the adjustment about hinge 19 by means of, for example, an electric motor as actuator 24, as described in FIG. 1, is not necessary.

Figure 7:
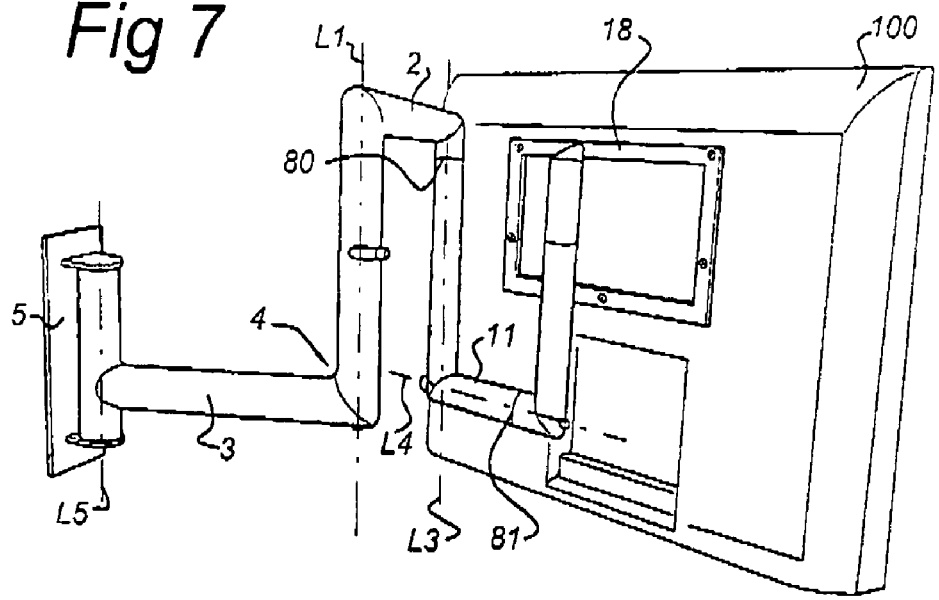
FIG. 7 shows an embodiment of the support arm from FIG. 6 in a tilted position and moved forward.

FIG. 7 shows an embodiment of a support arm for attachment to, for example, a wall. In this embodiment, the positions of the pivot joints have been selected somewhat differently from those in FIG. 6. One leg of the U-shaped member 2 is in this case shorter than the other leg, as a result of which the second pivot joint, indicated here by number 80, is situated at an earlier juncture in the support arm. In this embodiment, an L-shaped member is provided as from the second pivot joint, at the end of which a third pivot joint 81 is attached, which third pivot joint has a further L-shaped member to which the fastening part 18 is attached. In this case, a flat display screen is attached to the fastening part 18. The support arm is shown here in a position in which it has been rotated about axes L5, L1 and L3. By fitting more members and pivot joints, the distance of displacement from the wall can be increased further, as long as the axes of rotation are parallel to L5, L1 and L3, so that the display screen remains horizontal.

Figure 8:
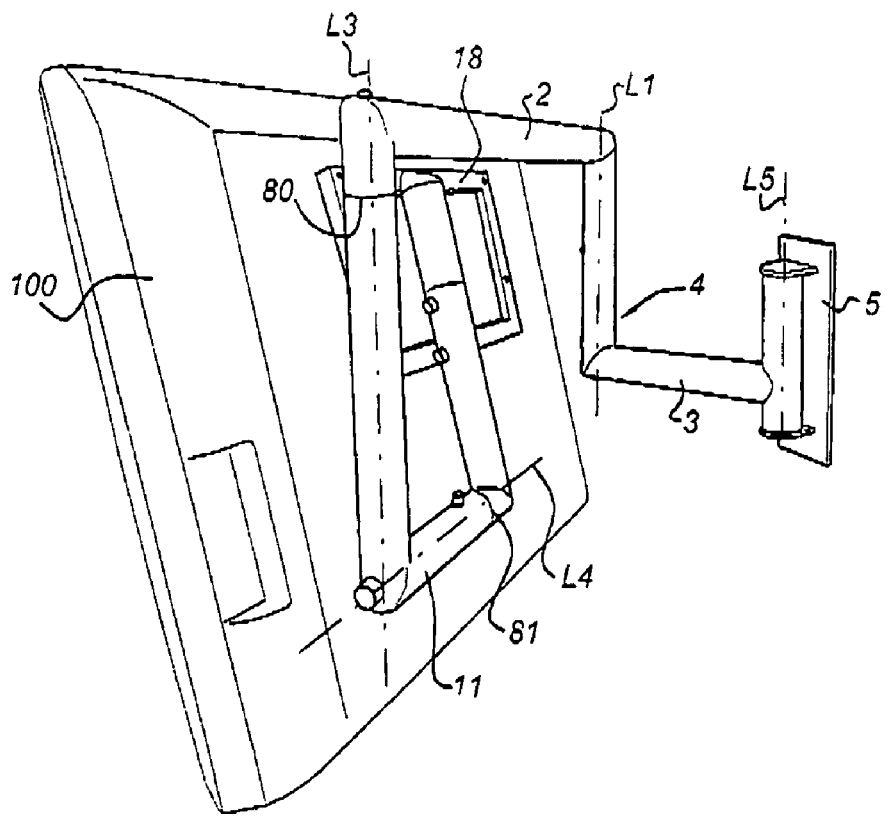
FIG. 8 shows the support arm from FIG. 7 tilted towards the other side.

The display screen can furthermore be titled about the axis of rotation L4. FIG. 8 shows the support arm from FIG. 7 tilted about this axis of rotation L4.

Figure 9:
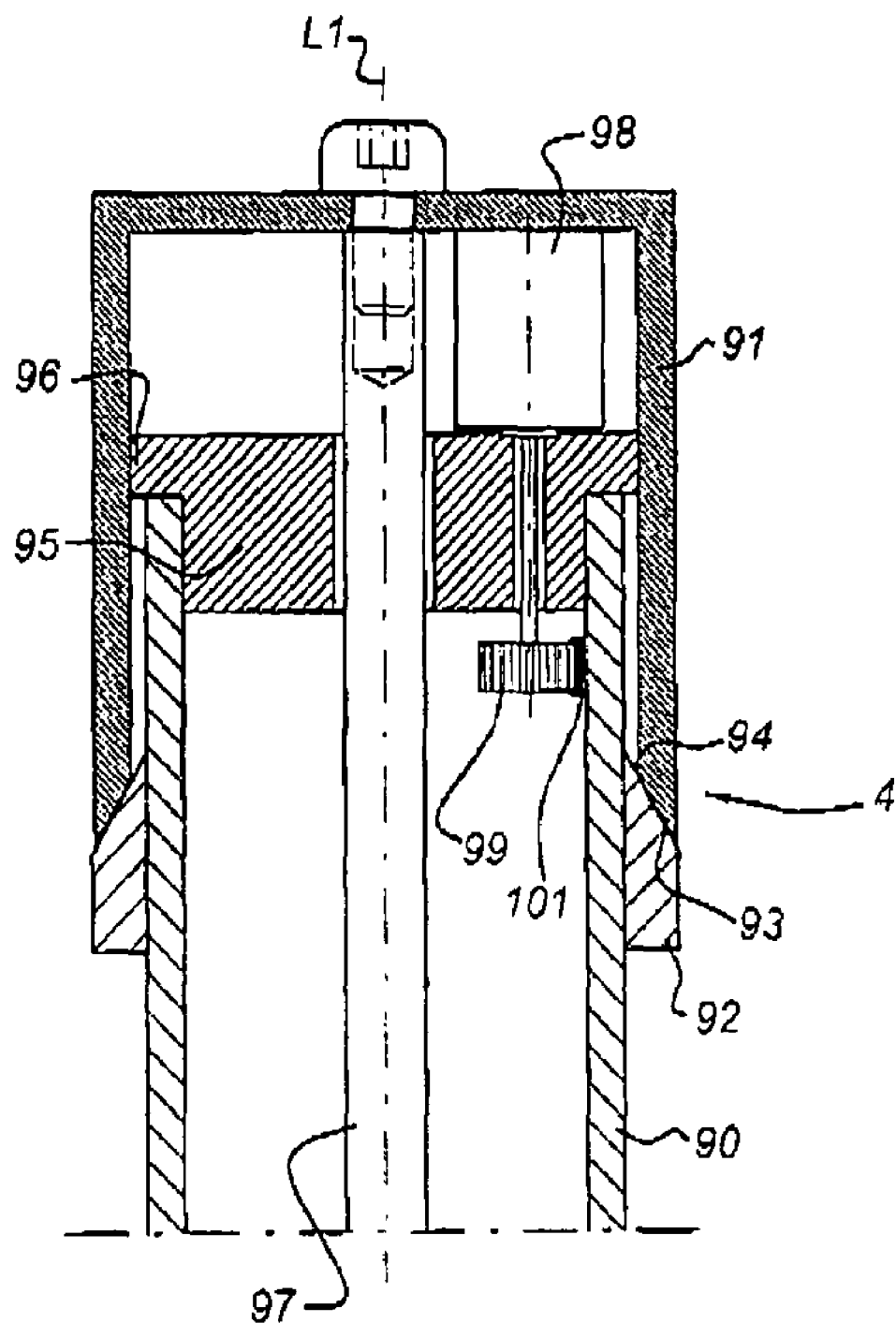
FIG. 9 shows an alternative pivot joint.

FIG. 9 shows an embodiment for a pivot hinge or pivot joint for, for example, the support arm from FIGS. 7 and 8. In this case, an inner tube 90 is partly accommodated inside an outer tube 91. The outer tube illustrated here has a limited length, but in practice a support arm according to FIG. 7 or 8 will have a great length and may possibly even be a leg of an angle part. A ring 92, preferably made of plastic such as nylon, is arranged around the outer tube 91 and has an end of the outer tube mounted on it. In order to ensure the outer tube is mounted without any play, the edge 93 of the ring 92 is bevelled, as can be seen in the figure. The end of the outer tube 91 also has a bevelled edge 94 which fits onto the bevelled edge 93 of the ring 92. In order to provide further stability and improve the mounting, the end of the inner tube 90 which extends into the outer tube 91 is provided here with an insert 95 an edge 96 of which extends outside the outside wall of the inner tube 90 up to the inner wall of the outer tube 91. The outer tube 91 is pulled onto the beveled edge 93 of the plastic ring 92 by means of a tie rod 97. For automation, the outer tube 91 is in this case also provided with an electric motor 98, the drive shaft of which extends through the insert and provided with a gear wheel 99 which engages with a (curved) gear rack 101 on the inside of the inner tube 90. Of course, it is also conceivable to change this configuration around, that is to say to mount the electric motor inside the inner tube and the gear rack (or a ring provided with internal toothing) in the outer rube.

Optionally, for example with the embodiment of FIGS. 7 and 8, it is also possible to fit a torsion spring or another pretensioned spring near joint 81 in order to compensate for the weight of a display screen or monitor.

It will be clear that the above description has been incorporated in order to illustrate the operation of the preferred embodiments of the invention and not in order to limit the scope of the invention. Based on the above explanation, many variations will be evident to the person skilled in the art which fall within the scope of the present invention.

The invention claimed is:
1. A support arm for an apparatus, preferably for a display screen, comprising:
   a first fastening part for attaching the support arm to a frame or a wall;

a first member, at one end coupled to the first fastening part and at another end coupled to a first pivot joint which allows rotation about a first axis of rotation;

a second member which, at a first end, is coupled to the first pivot joint, and, at a second end, is provided with a second pivot joint which allows rotation about a second axis of rotation; and a second fastening part for attaching the apparatus to the support arm, which second fastening part is coupled to the second pivot joint, the first and second axes of rotation essentially being parallel to one another, in which the second fastening part is connected to a third member and the third member is coupled to the second pivot joint and the third member is substantially L-shaped and in which the third member is connected to the second pivot joint via a third pivot joint.

2. The support arm according to claim 1, in which the second member is substantially U-shaped.

3. The support arm according to claim 1, in which the first member is substantially L-shaped.

4. The support arm according to claim 1, in which the third pivot joint has a third axis of rotation which is transverse to the first axis of rotation.

5. A support arm for a display screen comprising:

a first fastening part for attaching the support arm to a frame or a wall;

a first member, at one end coupled to the first fastening part and at another end coupled to a first pivot joint which allows rotation about a first axis of rotation;

a second member which, at a first end, is coupled to the first pivot joint, and, at a second end, is provided with a second pivot joint which allows rotation about a second axis of rotation; and a second fastening part for attaching the apparatus to the support arm, which second fastening part is coupled to the second pivot joint, the first and second axes of rotation essentially being parallel to one another, in which the members comprise tube parts, the pivot joints comprising inner tube parts rotatably mounted in the tube parts, for allowing rotation about the first and second axes of rotation, respectively, and in which inner tube parts are furthermore mounted by bearing parts at the ends of the inner tube parts which extend into the tube parts, the bearing parts outside the outer wall of the inner tube parts extending as far as against the inner wall of the outer tube parts, and preferably being made of plastic, such as nylon.

6. A support arm for a display screen comprising:

a first fastening part for attaching the support arm to a frame or a wall;

a first member, at one end coupled to the first fastening part and at another end coupled to a first pivot joint which allows rotation about a first axis of rotation;

a second member which, at a first end, is coupled to the first pivot joint, and, at a second end, is provided with a second pivot joint which allows rotation about a second axis of rotation; and a second fastening part for attaching the apparatus to the support arm, which second fastening part is coupled to the second pivot joint, the first and second axes of rotation essentially being parallel to one another, in which the members comprise tube parts, the pivot joints comprising inner tube parts rotatably mounted in the tube parts, for allowing rotation about the first and second axes of rotation, respectively, and in which the pivot joints furthermore comprise clamping parts for rotatably clamping the stop of an outer ring onto the end of the tube parts.

7. A support arm for an apparatus, preferably for a display screen, comprising:

a first fastening part for attaching the support arm to a frame or a wall;

a first member, at one end coupled to the first fastening part and at another end coupled to a first pivot joint which allows rotation about a first axis of rotation;

a second member which, at a first end, is coupled to the first pivot joint, and, at a second end, is provided with a second pivot joint which allows rotation about a second axis of rotation; and p1 a second fastening part for attaching the apparatus to the support arm, which second fastening part is coupled to the second pivot joint, the first and second axes of rotation essentially being parallel to ne another, in which the first joint is coupled with an actuator which, during operation, swivels the second member about the first axis of rotation, the second joint is coupled to a second actuator which, during operation, causes the second fastening to rotate or swivel about the second axis of rotation, and displaces the second fastening part relative to the first fastening part upon actuation of the first and second actuator.

8. A support arm, in particular for a flat display device, such as an LCD screen or plasma screen, comprising a first and second member having a first and second longitudinal axis and a first joint which connects the members to one another at an angle, the first member being coupled to a fastening part for attaching the arm, the first joint comprising a first angle part having a first and second end, the first end being coupled to the first member so as to be rotatable about the longitudinal axis of the first member, and the second end being coupled to the second member so as to be rotatable about the longitudinal axis of the second member, and the first and second end being coupled to a first and second drive unit, respectively, which are connected to a first and second member, respectively, in order to cause the first angle part, upon actuation of the first drive unit, to rotate about the longitudinal axis of the first member and in order to cause the second member, upon actuation of the second drive unit, to rotate about its longitudinal axis.

9. The support arm according to claim 8, furthermore comprising a third member having a longitudinal axis and a second joint which connects the second member and the third member to one another, the second joint comprising a second angle part having a first and second end, the first end being coupled to the second member so as to be rotatable about the longitudinal axis of the second member, and the second end being coupled to the third member so as to be rotatable about the longitudinal axis of the third member, and the first and second end are coupled to a third and fourth drive unit, respectively, which are coupled to the first and second member, respectively, in order to cause the second angle part, upon actuation of the third drive unit, to rotate about the longitudinal axis of the second member and in order to cause the third member, upon actuation of the fourth drive unit, to rotate about its longitudinal axis.

10. The support arm according to claim 9, in which the third member comprises a frame fastening part for attaching a frame, in particular for attaching a flat display device, such as an LCD screen or a plasma screen.

11. The support arm according to claim 8, in which, in a starting position, the fastening part and the first, second and, if present, third member and frame-fastening part are essentially situated in a starting plane.

12. The support arm according to claim 8, furthermore comprising a hinge connected to the first member and the fastening part for hingedly coupling the first member to the fastening part, as a result of which an angle adjustment of the longitudinal axis of the first member in the starting plane is possible.

13. The support arm according to claim 8, furthermore comprising an actuator between the fastening part and the first member, in particular, between the fastening part and, if present, the hinge, the actuator comprising a first actuator part which is connected to the fastening part and a second actuator part which is connected to the first member and/or the hinge, and the first and second actuator part being displaceable relative to one another along an axis of displacement.

14. The support arm according to claim 13, in which the axis of displacement is substantially parallel to the starting plane, and preferably extends substantially in the starting plane.

15. The support arm according to claim 8, in which the drive units are coupled to the pivot joints by means of transmissions, the transmission being provided with a drive shaft in line with the longitudinal axis and with a first ring with internal toothing thereon which is connected to the one tube part, an eccentric gear wheel with a toothing which is at least one tooth smaller than the internal toothing of the first ring and the toothing of which engages with the internal toothing of the first ring and which is provided with driver parts, and a second ring which is connected to the other tube part and which is provided with the driver parts which mate with the driver parts of the gear wheel, as a result of which the first and second ring rotate with respect to one another when the drive unit motor is in operation.

16. A support arm for a display screen comprising:

a first fastening part for attaching the support arm to a frame or a wall;

a first member, at one end coupled to the first fastening part and at another end coupled to a first pivot joint which allows rotation about a first axis of rotation;

a second member which, at a first end, is coupled to the first pivot joint, and, at a second end, is provided with a second pivot joint which allows rotation about a second axis of rotation; and a second fastening part for attaching the apparatus to the support arm, which second fastening part is coupled to the second pivot joint, the first and second axes of rotation essentially being parallel to one another, in which the members comprise tube parts, the pivot joints comprising inner tube parts rotatably mounted in the tube parts, for allowing rotation about the first and second axes of rotation, respectively, the inner tube parts mounted by means of an outer ring for forming a stop for an end of a tube part of a member, the stop running obliquely with the acute angle situated against the inner tube surface and the end surface of the tube parts running obliquely with the acute angle being situated at the outer surface.

17. The support arm of claim 16, wherein the outer ring is a plastic ring.

18. The support arm of claim 17, wherein the plastic ring is made of nylon.

\* \* \* \* \*